United States Patent
Imazaki et al.

(10) Patent No.: US 10,496,294 B2
(45) Date of Patent: Dec. 3, 2019

(54) DATA MIGRATION METHOD AND COMPUTER SYSTEM

(71) Applicant: Hitachi, Ltd., Tokyo (JP)

(72) Inventors: Miho Imazaki, Tokyo (JP); Masakuni Agetsuma, Tokyo (JP); Akira Yamamoto, Tokyo (JP); Akira Deguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 122 days.

(21) Appl. No.: 15/546,124

(22) PCT Filed: Feb. 24, 2016

(86) PCT No.: PCT/JP2016/055329
§ 371 (c)(1),
(2) Date: Jul. 25, 2017

(87) PCT Pub. No.: WO2017/145272
PCT Pub. Date: Aug. 31, 2017

(65) Prior Publication Data
US 2018/0121112 A1 May 3, 2018

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01); *G06F 3/0647* (2013.01); *G06F 3/0665* (2013.01)

(58) Field of Classification Search
CPC combination set(s) only.
See application file for complete search history.

(56) References Cited

U.S. PATENT DOCUMENTS

| | | | |
|---|---|---|---|
| 6,721,841 B2 | 4/2004 | Fukuzawa et al. | |
| 2009/0228632 A1 | 9/2009 | Murayama et al. | |
| 2012/0265956 A1* | 10/2012 | Nakamichi | G06F 3/0605 711/162 |

FOREIGN PATENT DOCUMENTS

JP 2009-217466 A 9/2009

OTHER PUBLICATIONS

International Search Report of PCT/JP2016/055329 dated Apr. 26, 2016.

* cited by examiner

*Primary Examiner* — Yong J Choe
(74) *Attorney, Agent, or Firm* — Mattingly & Malur, PC

(57) ABSTRACT

An instruction to associate a second logical volume with a second virtual storage, which is a migration destination of a first virtual storage that provides a first logical volume, is transmitted. The first virtual storage is a virtual storage to which a virtual resource provided by a virtual managing unit is allocated. A copy instruction, which is an instruction to copy data from either one of the first logical volume and a copy source logical volume of the first logical volume to the second logical volume is transmitted. When copy completion, which is completion of the data copy to the second logical volume, is detected, an erasing instruction, which is an instruction to erase the first virtual storage, is transmitted to the virtual managing unit.

13 Claims, 11 Drawing Sheets

Migration management table
45

| Virtual managing unit address | Migration destination SDS address | Migration source SDS address | Host address | Main migration manager address |
|---|---|---|---|---|
| 176.444.555.002 | 176.444.555.024 | 176.444.555.054 | 176.444.555.043 | null |

DATA MIGRATION METHOD AND COMPUTER SYSTEM

TECHNICAL FIELD

The present invention generally relates to data migration.

BACKGROUND ART

In general, for construction of a computer system, hardware such as a server apparatus and a storage apparatus is procured according to a use of the computer system and system requirements.

Data migration is performed in the computer system. As one of purposes of the data migration, there is migration of the storage apparatus. It is conceivable to use, for example, a technique of PTL 1 for the migration of the storage apparatus. According to the technique of PTL 1, a heterogeneous storage is coupled to an existing storage and data management information of the heterogeneous storage is configured in the existing storage. If this technique is used for the migration of the storage apparatus, by coupling a migration source storage apparatus to a migration destination storage apparatus, it can be expected that the migration is realized without stopping the migration source storage apparatus for a long time.

CITATION LIST

Patent Literature

[PTL 1] U.S. Pat. No. 6,721,841

SUMMARY OF INVENTION

Technical Problem

In recent years, conversion of SDx (Software-defined xxx), that is, a target (xxx) in a computer system into software is adopted. For example, SDx targeting a server is SDC (Software-defined Computing).

SDx for storage is an SDS (Software-defined Storage). The SDS is a virtual storage, that is, a hardware-independent storage. The SDS may be an example of software operating on a physical apparatus or a virtual apparatus or may be an example of the virtual apparatus itself. The "physical apparatus" is an apparatus including a plurality of physical resources including a physical processor and a physical memory, for example, a physical computer such as a general-purpose server. The "virtual apparatus" is an apparatus including a plurality of virtual resources (e.g., a virtual processor and a virtual memory) based on the plurality of physical resources and is, for example, an LPAR (Logical Partition) or a VM (Virtual Machine).

It is conceivable that migration of the SDS is performed in the same manner as the migration of the storage apparatus. As a reason why the migration of the SDS is performed, there is, for example, replacement with an SDS having a new function or a change of an SDS vendor.

If the technique of PTL 1 is used for the migration of the SDS, by coupling a migration source SDS to a migration destination SDS, it can be expended to realize the migration without stopping the migration source SDS for a long time.

However, when a host writes or reads data, since the data passes through the migration source SDS, it is necessary to maintain the migration source SDS even after the migration. At least one resource (a virtual resource or a physical resource) for the migration source SDS remains necessary.

Further, in general, since a virtualized resource is allocated to the SDS, it is assumed that the SDS itself cannot control both of reservation and release of the resource.

Solution to Problem

An instruction to associate a second logical volume with a second virtual storage, which is a migration destination of a first virtual storage that provides a first logical volume, is transmitted. The first virtual storage is a virtual storage to which a virtual resource provided by a virtual managing unit is allocated. A copy instruction, which is an instruction to copy data from either one of the first logical volume and a copy source logical volume of the first logical volume to the second logical volume, is transmitted. When copy completion, which is completion of the data copy to the second logical volume, is detected, an erasing instruction, which is an instruction to erase the first virtual storage, is transmitted to the virtual managing unit.

Advantageous Effects of Invention

It is possible to release the first virtual storage itself including the virtual resource allocated to the first virtual storage.

DESCRIPTION OF EMBODIMENTS

In the following explanation, a "physical apparatus" is an apparatus including a plurality of physical resources including a physical processor and a physical memory, for example, a physical computer such as a general-purpose server. A "virtual apparatus" is an apparatus including a plurality of virtual resources (e.g., a virtual processor and a virtual memory) based on the plurality of physical resources and is, for example, an LPAR (Logical Partition) or a VM (Virtual Machine). A "processor" means at least one of a physical processor or a virtual processor. A "memory" means at least one of a physical memory and a virtual memory. An "interface" means at least one of a physical interface and a virtual interface.

In the following explanation, processing is sometimes explained using a "program" as a subject. However, the program is executed by the processor to perform decided processing while using at least one of the memory and the interface as appropriate. Therefore, the subject of the processing may be the processor (or the physical apparatus or the virtual apparatus including the processor). The program may be installed in a computer from a program source. The program source may be, for example, a program distribution server or a recording medium readable by a computer. In the following explanation, two or more programs may be realized as one program or one program may be realized as two or more programs.

In the following explanation, information is sometimes explained by expressions "xxx cable" and "xxx bitmap". However, the information may be represented by any data structure. That is, in order to indicate that the information does not depend on a data structure, the "xxx table" and the "xxx bitmap" can be respectively referred to as "xxx information". In the following explanation, the conf iguration of a table is an example. One table may be divided into two or more tables or all or a part of two or more tables may be one table (the same may be applied to a bitmap).

In the following explanation, when the same kinds of elements are explained without being distinguished, reference signs (or common portions in the reference signs) are sometimes used. When the same kinds of elements are distinguished and explained, IDs of the elements (or reference signs of the elements) are sometimes used.

In the following explanation, "VOL" is an abbreviation of logical volume. The VOL may be a logical volume based on one or more physical storage devices (or one or more virtual storage devices) or may be a virtual logical volume conforming to Thin Provisioning.

First Embodiment

Figure 1:
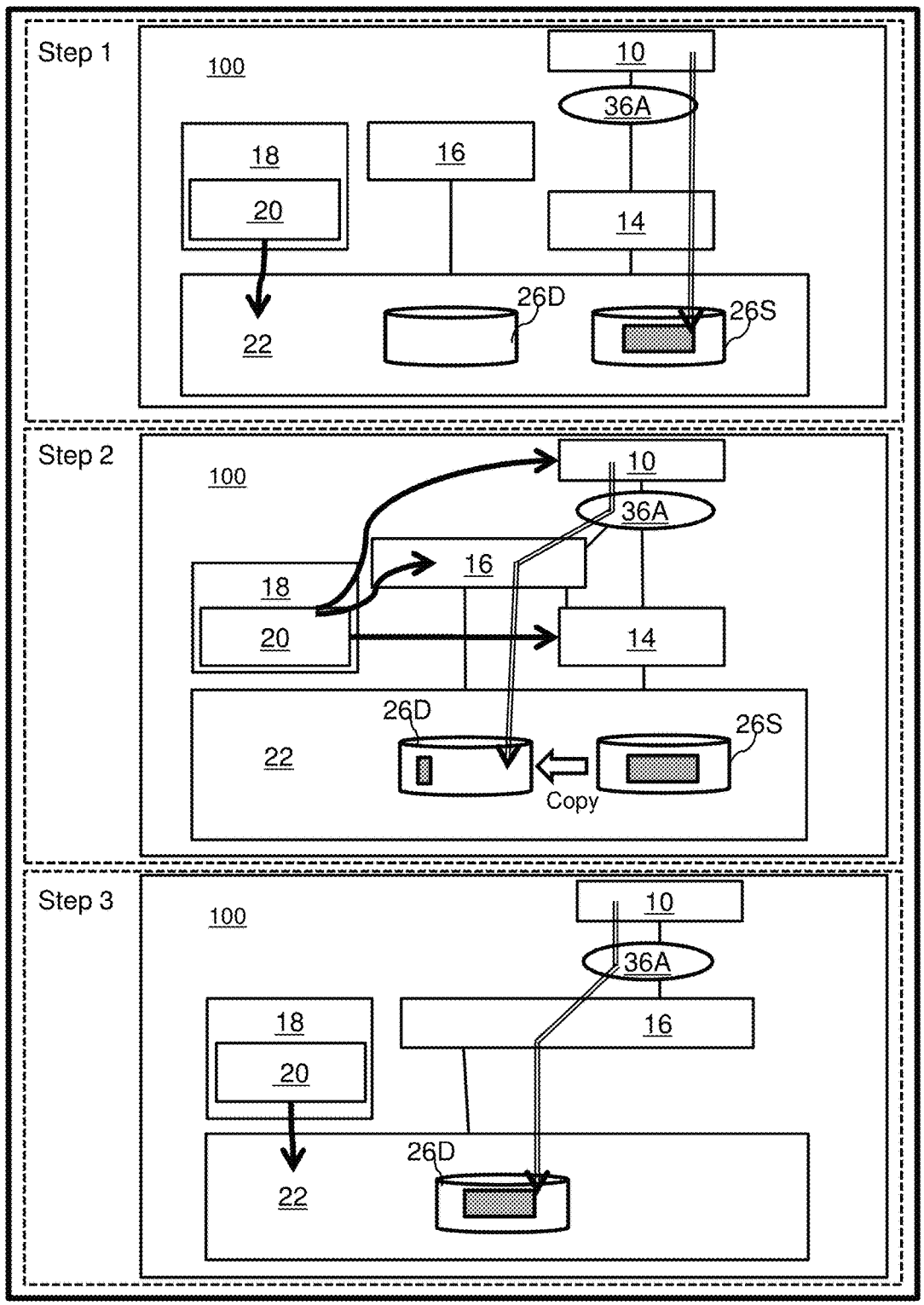
FIG. 1 shows an overview of a first embodiment.

FIG. 1 shows an overview of a first embodiment.

As a state before step 1, a computer system 100 includes a virtual managing unit 22, a migration source SDS 14, a migration source VOL 26S, a management VM (Virtual Machine) 18, and a host 10. The virtual managing unit 22 is a virtualization program (e.g., a hyper visor) that provides a virtualized resource. Specifically, for example, the virtual managing unit 22 is a base for showing a physical server as virtual and is, as an example, a cloud base. Besides the virtualized resource, the virtual managing unit 22 can also provide an apparatus to which the virtualized resource is allocated. Each of the migration source SDS 14, the management VM 18, and the host 10 is a VM created by the virtual managing unit 22. The VM is an example of a virtual apparatus. A migration manager 20 is installed in the management VM 18. The migration source SDS 14 is an example of a first virtual storage. The migration source VOL 26S is an example of a first logical volume. Note that the virtual managing unit 22 may be a physical processor that executes the virtualization program explained above (specifically, may be realized by a physical processor executing the virtualization program) or may be an apparatus (e.g., a module) including a memory in which the virtualization program is retained and a physical processor that executes the virtualization program.

The migration source VOL 26S is associated with (e.g., mounted on) a migration source SDS 14. The migration source VOL 26S is provided to the host 10 by the migration source SDS 14. When receiving an I/O (Input/Output) request designating an ID (identification information) of the migration source VOL 26S from the host 10, the migration source SDS 14 executes, on the migration source VOL 26S, I/O conforming to the received I/O request (i.e., executes reading of data from the migration source VOL 26S or writing of data in the migration source VOL 26S). The ID of the migration source VOL 26S includes, for example, a volume number (e.g., a LUN (Logical Unit Number)) of the migration source VOL 26S.

<Step 1>

The migration manager 20 transmits a creation instruction for a migration destination SDS 16 to the virtual managing unit 22. In response to the creation instruction, the migration destination SDS 16 is constructed in the computer system 100, in which the migration source SDS 14 is present, by the virtual managing unit 22. In this embodiment, a reason for SDS migration is a change of an SDS vendor. Therefore, a vendor of the migration source SDS 14 and a vendor of the migration destination SDS 16 are different. However, the vendors may be the same vendor. In the construction of the migration destination SDS 16, a migration destination VOL 26D is associated with the migration destination SDS 16. Note that the migration destination SDS 16 is an example of a second virtual storage. The migration destination VOL 26D is an example of a second logical volume. At this stage, I/O conforming to an I/O request designating the ID of the migration source VOL 26S is performed on the migration source VOL 26S through the migration source SDS 14.

<Step 2>

The migration manager 20 issues an instruction to the migration destination SDS 16 and the migration source SDS 14 to enable the migration destination SDS 16 to access the migration source SDS 14. Consequently, target information, which is information including the ID of the migration source VOL 26S, is associated with the migration destination VOL 26D. That is, the migration source VOL 26S is mapped to (associated with) the migration destination SDS 16 through the migration source SDS 14 according to a storage virtualization technique. In the following explanation, for convenience, the VOL being associated with another storage via a storage is sometimes referred to as "external coupling".

After completion of the external coupling, the migration manager 20 instructs the host 10 to change an access destination from the migration source SDS 14 to the migration destination SDS 16. Consequently, the migration destination SD 16 receives the I/O request designating the ID of the migration source VOL 26S. When receiving such an I/O request, the migration destination SD 16 executes I/O on the migration destination VOL 26D.

Thereafter, the migration manager 20 transmits, to at least one of the migration source SDS 14 and the migration destination SDS 16, a copy instruction to copy data of the migration source VOL 26S to the migration destination VOL 26D. In response to the copy instruction, data stored in the migration source VOL 26S is copied to the migration destination VOL 26D through the migration source SDS 14 and the migration destination SDS 16. That is, data copy is performed from the migration source VOL 26S to the migration destination VOL 26D. Note that, even during the copy, the migration destination SDS 16 can receive the I/O request designating the ID of the migration source VOL 26S from the host 10 and executes I/O conforming to the received I/O request on the migration destination VOL 26D. When data is written anew in an un-copied area (an area not copied yet) in the migration source VOL 26S, after the data is copied from the migration source VOL 26S to the migration destination VOL 26D first, the new data received from the host 10 is written in the migration destination VOL 26D. Note that, in FIG. 1, gray blocks represent data. A block diagram of step 2 in FIG. 1 means that a part of the data in the migration source VOL 26S is copied to the migration destination VOL 26D.

<Step 3>

Copy completion is detected. The "copy completion" may indicate that there is no difference between content of the migration source VOL 26S and content of the migration destination VOL 26D, in other words, the "copy completion" may indicate that the content of the migration source VOL 26S and the content of the migration destination VOL 26D coincide with each other. Specifically, for example, the migration manager 20 receives notification of the copy completion from at least one of the migration source SDS 14 and the migration destination SDS 16. More specifically, for example, the migration manager 20 transmits an inquiry about a progress of the data copy to at least one of the migration source SDS 14 and the migration destination SDS 16, receives a response to the inquiry from at least one of the migration source SDS 14 and the migration destination SDS 16 (a transmission destination of the inquiry), and detects the copy completion on the basis of the received response. When the copy completion is detected, the migration manager 20 transmits an erasing instruction, which is an instruction to erase the migration source SDS 14 and the migration source VOL 26S, to the virtual managing unit 22. In response to the erasing instruction, the migration source SDS 14 and the migration source VOL 26S are erased by the virtual managing unit 22. The virtual managing unit 22 may erase the migration source SDS 14 after releasing all virtual resources allocated to the migration source SDS 14 from the migration source SDS 14. Alternatively, as a result of the erasing of the migration source SDS 14, all the virtual resources allocated to the migration source SDS 14 may be released.

According to this embodiment, when the migration destination VOL 26D is associated with the migration destination SDS 16 and the copy from the migration source VOL 26S to the migration destination VOL 26D is completed, the migration source SDS 14 and the migration source VOL 26S can be rated as an SDS and a VOL that do not need to be maintained. Therefore, the migration source SDS 14 and the migration source VOL 26S can be erased. Consequently, it is possible to expect reduction of at least one of resources and cost. Note that at least the migration source SDS 14 only has to be erased. It is possible to expect a further reduction by erasing the migration source VOL 26S as well.

According to this embodiment, the migration manager 20 can collectively manage migration processing. It is possible to finally erase the migration source SDS 14 without stopping the migration source SDS 14 for a long time. Therefore, SDS migration is facilitated. It can be expected that SDS operation cost is reduced.

Note that, in this embodiment, the external coupling is adopted. However, the adoption of the external coupling is not essential. By adopting a technique different from the external coupling, it is also possible to realize copying (duplication) of the data of the migration source VOL 26S without stopping the reception of the I/O request from the host 10.

In this embodiment, switching of an access destination VOL of the host 10 is performed before a copy start (before copy instruction transmission). However, the switching of the access destination VOL may be performed during the copy or may be performed after the copy completion. When the external coupling is adopted, the switching of the access destination VOL is performed before the copy start as explained above.

This embodiment is explained in detail below.

Figure 2:
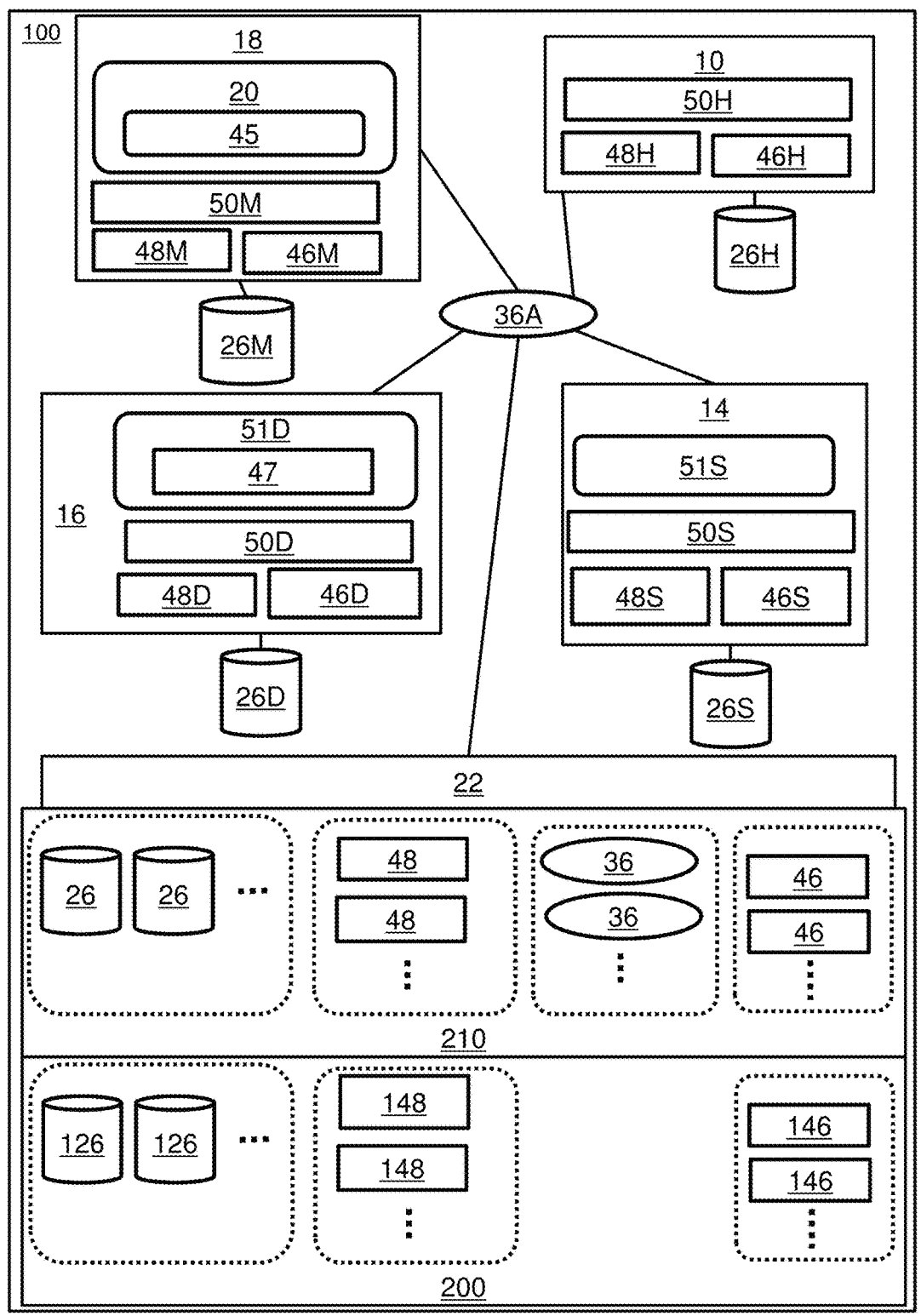
FIG. 2 shows the configuration of a computer system according to the first embodiment.

FIG. 2 shows the configuration of the computer system 100.

The computer system 100 includes a physical resource group 200 and executes the virtual managing unit 22. A virtual resource group 210, which is a plurality of resources obtained by virtualizing at least a part of the physical resource group 200, is managed by the virtual managing unit 22. A VM, to which at least a part of the virtual resource group 210 is allocated, is created by the virtual managing unit 22.

In this embodiment, a "resource" is a general term of a physical resource and a virtual resource. The physical resource group 200 is a plurality of physical resources including a plurality of kinds of physical resources. As a physical resource, for example, there is at least one of a physical processor (e.g., a CPU (Central Processing Unit)) 148, a physical memory 146, a physical storage device 126, and a physical interface (not shown in the Figure). The virtual resource group 210 is a plurality of virtual resources including a plurality of kinds of virtual resources. As the virtual resource, for example, there is at least one of a virtual processor 48, a virtual memory 46, a VOL 26, a virtual interface (not shown in the figure), and a virtual network 36. The virtual resource may be based on a physical resource of a type same as the type of the virtual resource or may be based on a physical resource of a type different from the type of the virtual resource.

At least one physical processor executes the virtual managing unit 22. The virtual managing unit 22 is an example of a visualization program and is, for example, a hypervisor. The virtual managing unit 22 can create and erase a VM. Each VM is mounted with one or more virtual processors 48, one or more virtual memories 46, and one or more virtual interfaces (not shown in the figure) and is mounted with one or more VOLs 46. For example, the virtual interface is am interface for communication via the virtual network 36. Each VM executes a guest OS (Operating System) 50.

In this embodiment, the host 10, the management VM 13, the migration source SDS 14, and the migration destination SDS 16 are VMs created and managed by the virtual managing unit 22. The host 10 and the management VM 18 may be physical apparatuses coupled to the computer system 100 or may be virtual apparatuses in a computer system (not shown in the figure) coupled to the computer system 100. The migration destination SDS 16 may be constructed in the computer system (not shown in the figure) coupled to the computer system 100.

In the migration source SDS 14, a virtual processor 48S, a virtual memory 46S, a guest OS 50S, and the like are present. A storage control program (hereinafter, migration source program) 51S is installed in the migration source SDS 14. The migration source program 51S controls the operation of the migration source SDS 14. For example, the migration source program 51S performs I/O on the migration source VOL 26S according to an I/O request from the host 10. The guest OS 50S and the migration source program 51S are executed by a virtual processor 48A. The migration source VOL 26S is mounted on the migration source SDS 14.

In the migration destination SDS 16, a virtual processor 48D, a virtual memory 46D, and a guest OS 50D, and the like are present. A storage control program (hereinafter, migration destination program) 51D is installed in the migration destination SDS 16. The migration destination program 51D logically retains copy information 47 for managing a data copy progress state from the migration source VOL 26S to the migration destination VOL 26D. The copy information 47 is stored in the virtual memory 46D. The guest OS 50D and the migration destination program 51D are executed by the virtual processor 48D. The migration destination VOL 26D is mounted on the migration destination SDS 16. The migration manager 20 of the management VM 18 may retain the copy information 47.

The migration destination SDS 16 may be an architecture same as the migration source SDS 14. An amount of a virtual resource of the migration destination SDS 16 may be the same as or may be different from an amount of a virtual resource of the migration source SDS 14. The migration destination program 51D may have a new function absent in the migration source program 51S or may not have a part of (e.g., a function with low necessity) among functions of the migration source program 51S. A capacity of the migration destination VOL 26D associated with the migration destination SDS 16 may be the same as a capacity of the migration source VOL 26S or the capacities may be different.

In the host 106, a virtual processor 48H, a virtual memory 46H, a guest OS 50H, and the like are present. A VOL 26H is mounted on the host 10.

In the management VM 18, a virtual processor 48M, a virtual memory 46M, a guest OS 50M, and the like are present. The migration manager 20 is installed in the management VM 18. The migration manager 20 logically retains a migration management table 45 in which addresses of modules that can be a communication partner of the migration manager 20 are recorded. The migration management table 45 is stored in the virtual memory 46M. A VOL 26M is mounted on the management VM 18.

The management VM 18, the host 10, the migration source SDS 14, the migration destination SDS 16, and the virtual managing unit 22 are coupled to a virtual network 36A. Communication is performed via the virtual network 36A. Communication between VMs is performed through the virtual network 36A. The communication between the VMs may be performed further through the virtual managing unit 22.

Figures 3, 4:
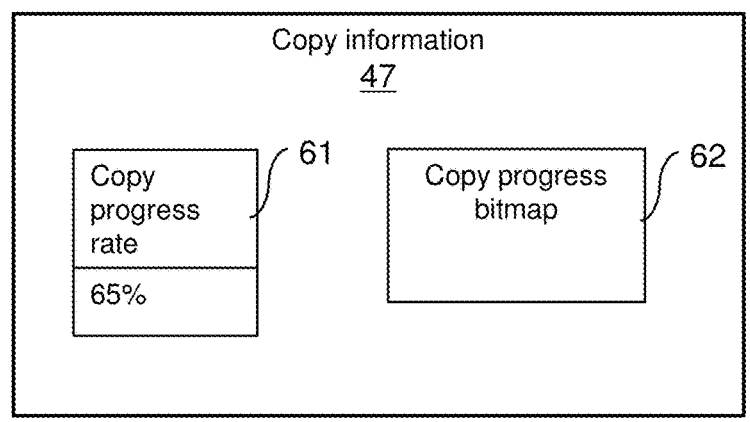
FIG. 3 shows the configuration of a migration management table.
FIG. 4 shows the configuration of copy information.

FIG. 3 shows the configuration of the migration management table 45.

The migration management table 45 retains an address of the virtual managing unit 22, an address of the migration destination SDS 16, an address of the migration source SDS 14, an address of the host 10, and an address of a main migration manager. A value of an unnecessary address is an invalid value (e.g., "null"), in this embodiment, since the main migration manager is absent, a value of the address of the main migration manager is "null" (the main migration manager is explained in embodiments 2 and 3).

The migration manager 20 specifies an address of an instruction destination from the migration management table 45 and issues an instruction to the instruction destination via the virtual network 36A using the specified address. The addresses recorded in the migration management table 45 are addresses on the virtual network 36A. The addresses may be, for example, numbers of ports of a virtual network switch.

FIG. 4 shows the configuration of the copy information 47.

The copy information 47 includes copy progress rate information 61 and a copy progress bitmap 62.

The copy progress rate information 61 represents a progress rate of copying from the migration source VOL 26S to the migration destination VOL 26D. A copy progress rate "100%" means copy completion. The copy progress rate is updated by the migration destination program 51D according to the progress of the copy.

The copy progress bitmap 62 includes a plurality of bits respectively corresponding to a plurality of VOL areas configuring the migration destination VOL 26D. If the copy is not completed for a VOL area cor responding to a bit, the bit is "0". On the other hand, when the copy is completed for a VOL area corresponding to a bit, the bit is "1".

The copy from the migration source VOL 26S to the migration destination VOL 26D may be performed for each VOL area. Every time the copy is completed for a VOL area, a bit is updated from "0" to "1" by the migration destination program 51D. The migration destination program 51D calculates a copy progress rate on the basis of the copy progress bitmap 62 and updates the copy progress rate information 61. Note that, as explained above, the migration manager 20 of the management VM 18 may retain the copy information 47. In that case, the migration manager 20 updates the copy progress rate information 61 on the basis of a response to an inquiry about a progress of data copy.

Figure 5:
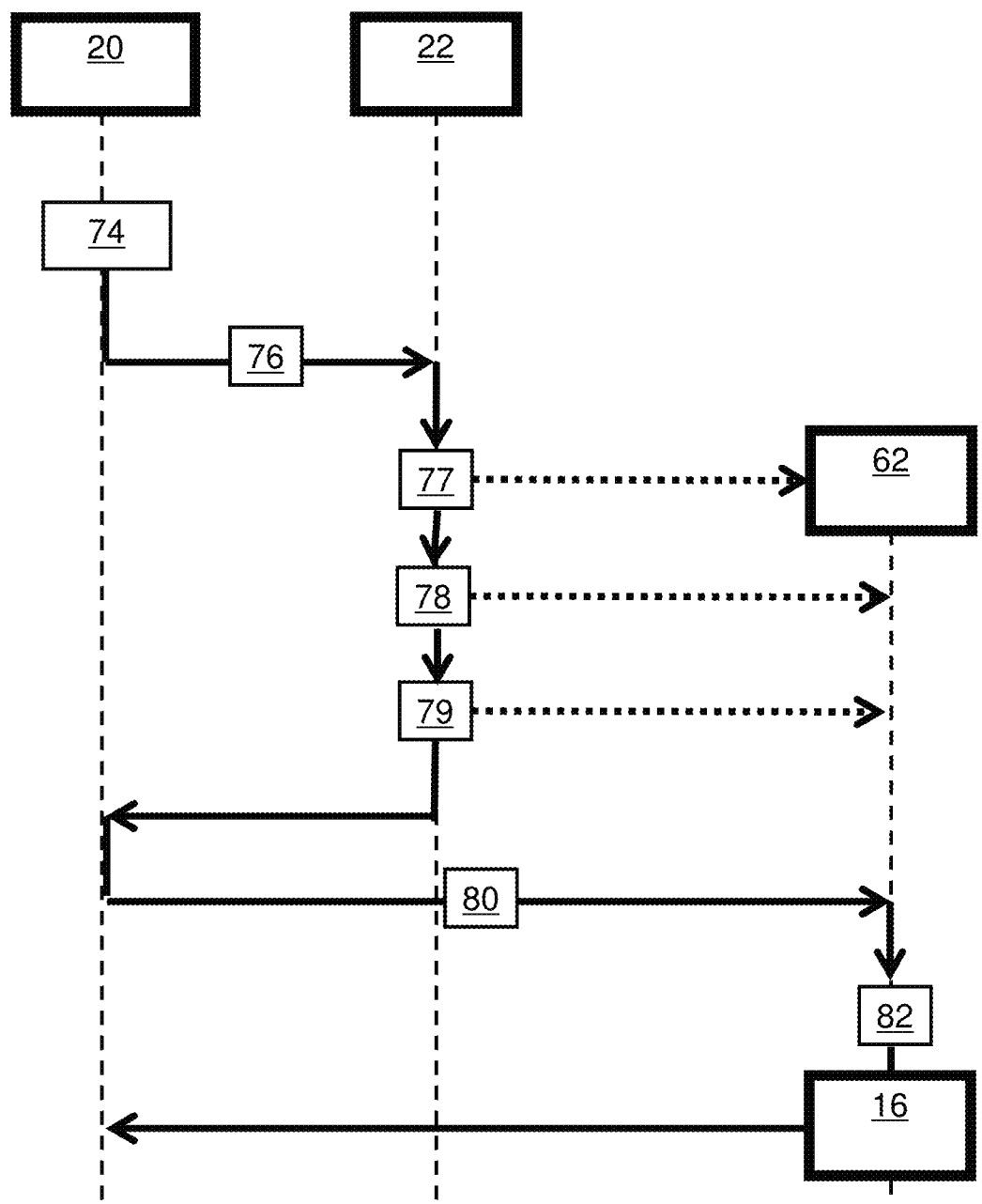
FIG. 5 is a sequence chart of migration destination SDS construction processing.

FIG. 5 is a sequence chart of migration destination SDS construction processing. The processing in FIG. 5 corresponds to the details of step 1 in FIG. 1.

Step 74: The migration manager 20 starts (e.g., updates the migration management table 45 according to necessity) according to an input (e.g., an instruction for creation of the migration destination SDS 16) from a user (e.g., an administrator), detection of a migration start time point, or the like. The processing proceeds to step 76.

Step 76: The migration manager 20 transmits a creation instruction to create a new VM (a VM for the migration destination SDS 16) 62 to the virtual managing unit 22. At that point, the migration manager 20 may determine migration destination specifications on the basis of at least one of configuration information and a use state of the migration source SDS 14. Information representing the determined migration destination specifications may be included in the creation instruction to the virtual managing unit 22. The "migration destination specifications" are specifications of a migration destination SDS and may be, for example, at least one of a capacity of the migration destination VOL 26D and a configuration and an amount of a virtual resource allocated to the new VM 62. The migration manager 20 may acquire at least one of the configuration information and the use state of the migration source SDS 14 from the migration source SDS 14. The processing proceeds to step 77.

Step 77: The virtual managing unit 22 creates the new VM 62 in response to the creation instruction from the migration manager 20. At this stage, for example, at least one of virtual resources including a virtual processor and a virtual memory may be allocated to the new VM 62. At this stage, a guest OS may be loaded to the new VM 62. The processing proceeds to step 78.

Step 78: Subsequently, the virtual managing unit 22 associates the migration destination VOL 26D with the new VM 62. A capacity of the migration source VOL 26S is, for example, a capacity conforming to the migration destination specifications included in the creation instruction. The capacity of the migration source VOL 26S is the same as the capacity of the migration source SDS 14 as explained above. However, the capacity may be set to a capacity with which the performance is equal to or larger than the performance of the migration source SDS 14 or may be set to a capacity corresponding to a use amount of the migration source VOL 26S. The processing proceeds to step 79.

Step 79: The virtual managing unit 22 allocates a virtual network to the new VM 62. The virtual network may be, for example, a virtual network switch of the same sub-net mask such that the new VM 62 can access the migration source SDS 14, the host 10, and the management VM 18. Thereafter, the virtual managing unit 22 notifies processing completion to the migration manager 20 as a response to the creation instruction. The processing proceeds to step 80.

Step 80: The migration manager 20 transmits an install instruction to install the migration destination program 51D to the new VM 62. The install instruction may include the migration destination program 51D or may include a link (e.g., a URL) to a download source of the migration destination program 51D. The migration destination program 51D does not have to be the same as the migration source program 51S as explained above. The processing proceeds to step 82.

Step 82: The new VM 62 (e.g., the guest OS) installs the migration destination program 51D in response to the install instruction. The new VM 62, in which the migration destination program 51D is installed and with which the migration destination VOL 26D is associated, is the migration destination SDS 16. The new VM 62 notifies processing completion to the migration manager 20 as a response to the install instruction. When the migration manager 20 receives the processing completion, a flow of FIG. 6 is started.

Figure 6:
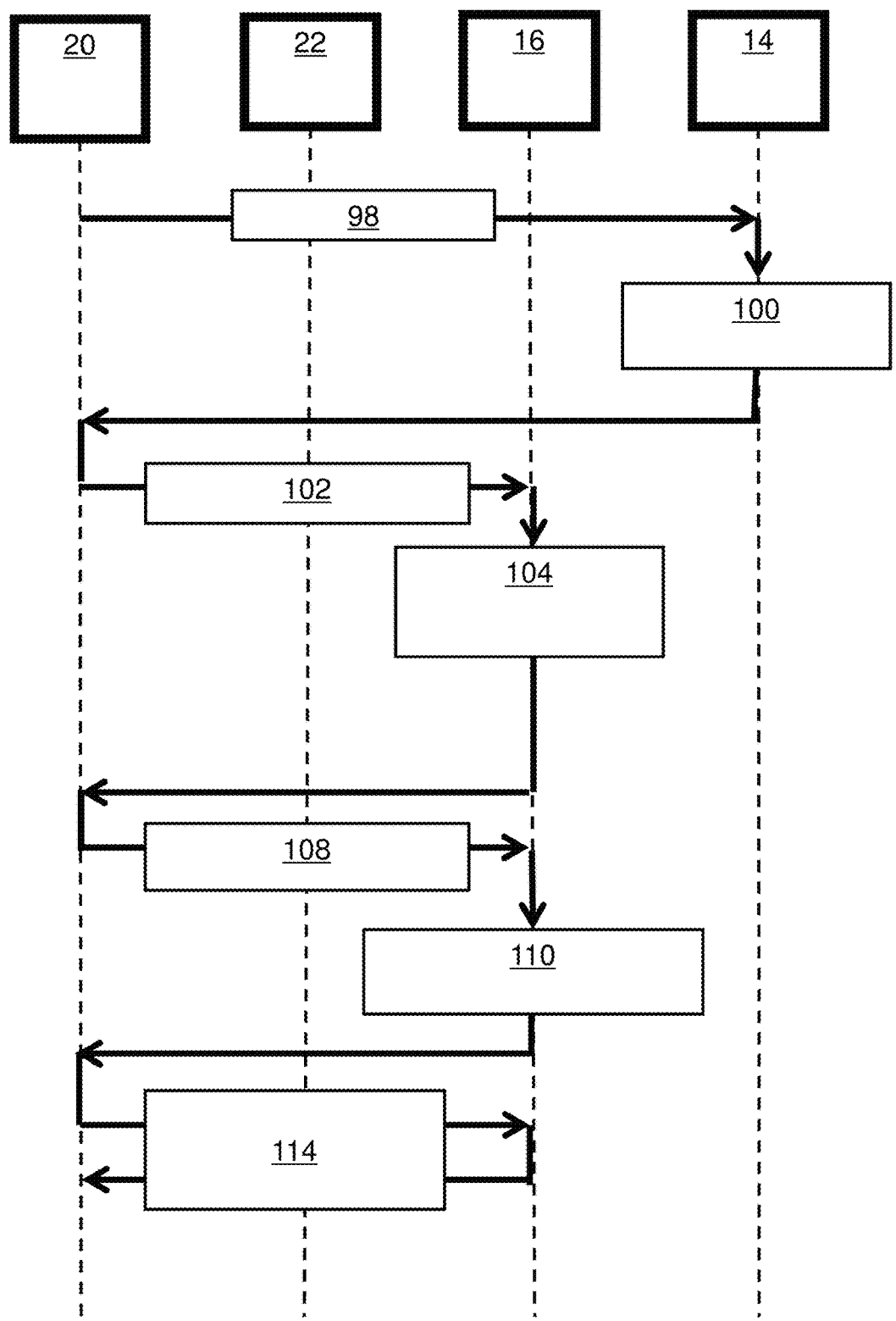
FIG. 6 is a sequence chart of copy preparation processing.

FIG. 6 is a sequence chart of copy preparation processing. The processing in FIG. 6 corresponds to details of a part of step 2 in FIG. 1.

Step 98: The migration manager 20 transmits, to the migration source SDS 14, a permission instruction, which is an instruction to permit an access from the migration destination SDS 16 to the migration source VOL 26S. The processing proceeds to step 100.

Step 100: The migration source SDS 14 (the migration source program 51S) configures, in response to the permission instruction, target information including identification information of the migration source VOL 26S and identification information of a virtual port to which the migration source VOL 26S belongs. A protocol of the virtual network may be an FC (Fiber Channel) or may be iSCSI or the like. Thereafter, the migration source SDS 14 notifies processing completion to the migration manager 20 as a response to the permission instruction. The processing proceeds to step 102. The processing completion includes the configured target information.

Step 102: The migration manager 20 transmits an external coupling instruction, which is an instruction to associate the migration source VOL 26S with the migration destination SDS 16 through the migration source SDS 14, to the migration destination SDS 16. The processing proceeds to step 104. The external coupling instruction includes the target information included in the processing completion.

Step 104: The migration destination SDS 16 (the migration destination program 51D) registers the target information of the migration source SDS 14 in response to the external coupling instruction to recognize the migration source VOL 26S. That is, the migration source VOL 26S is associated with the migration destination SDS 16. When the migration source SDS 14 cannot recognize the migration source VOL 26S, the migration destination SDS 16 may poll a port of the migration destination SDS 16 or may restart the guest OS of the migration destination SDS 16. As a method in which the migration destination program 51D recognizes the migration source VOL 26S, for example, a method described in PTL 1 may be adopted. Thereafter, the migration destination SDS 16 notifies processing completion to the migration manager 20 as a response to the external coupling instruction. The processing proceeds to step 108.

Step 108: The migration manager 20 transmits a preparation instruction, which is an instruction to prepare a copy from the migration source VOL 26S to the migration destination VOL 26D, to the migration destination SDS 16. The processing proceeds to step 110.

Step 110: The migration destination SDS 16 creates the copy information 47 in response to the preparation instruction. At this stage, in the copy information 47, the copy progress rate information 61 represents a copy progress rate "0%" and all the bits configuring the copy progress bitmap 62 are "0". Thereafter, the migration destination SDS 16 notifies processing completion to the migration manager 20 as a response to the preparation instruction. The processing proceeds to step 114.

Figure 7:
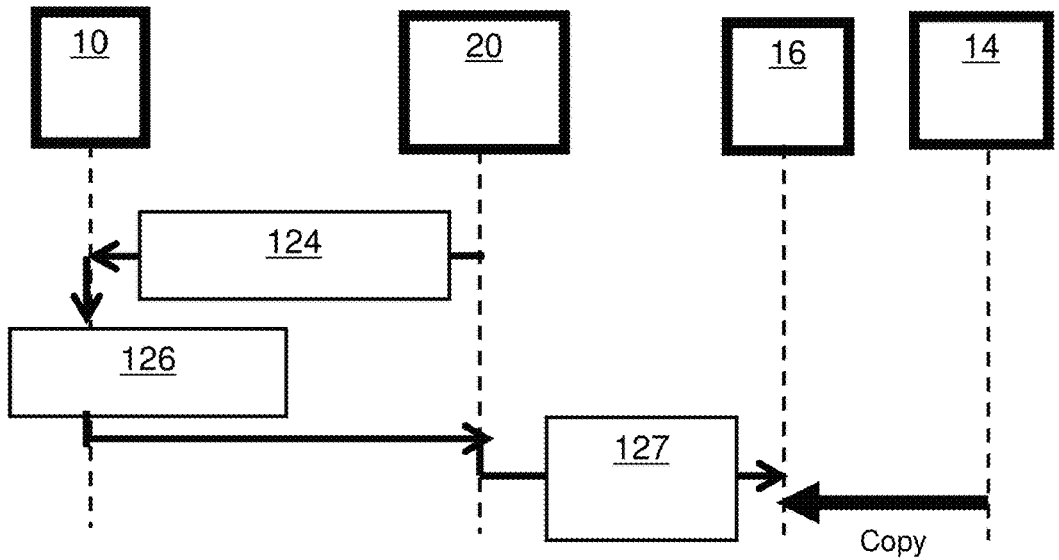
FIG. 7 is a sequence chart of access destination switching processing.

Step 114: The migration manager 20 regularly or irregularly transmits an inquiry about a copy progress rate to the migration destination SDS 16 and receives a replay of the copy progress rate as a response to the inquiry. In parallel to the processing in step 114, processing in step 124 in FIG. 7 is carried out. Note that the migration destination SDS 16 may regularly or irregularly notify the copy progress rate to the migration manager 20 without receiving the inquiry from the migration manager 20 or may notify the copy completion to the migration manager 20 when detecting that the copy progress rate reaches "100%". In any case, the migration manager 20 can learn presence or absence of the copy completion from information received from the migration destination SDS 16.

FIG. 7 is a sequence chart, of access destination switching processing. Processing in FIG. 7 may be carried out in parallel to step 114 after the completion of step 110. The processing in FIG. 7 corresponds to another part of step 2 in FIG. 1.

Step 124: The migration manager 20 transmits notification of an address (an address on a virtual network) of the migration destination SDS 16 to the host 10. The processing proceeds to step 126.

Step 126: The host 10 switches an address of an access destination from the address of the migration source SDS 14 to the address of the migration destination SDS 16 in response to the notification of the address. The switching may be manually performed or may be performed by a server agent executed in the host 10. Thereafter, the host 10 notifies processing completion to the migration manager 20 as a response to the notification of the address. The processing proceeds to step 127.

Step 127: The migration manager 20 transmits a VOL migration instruction to the migration destination SDS 16. In the VOL migration instruction, for example, migration source information (information including identification information of the migration source VOL 26S) and migration destination information (information including identification information of the migration destination VOL 26D) are designated. The migration destination SDS 16 carries out copying from the migration source VOL 26S to the migration destination VOL 26D in response to the VOL migration instruction. The copy information 47 is updated by the migration destination assumed that data is written in the migration destination VOL 26D anew from the host 10. When a bit corresponding to a VOL area at a copying destination of a VOL area at a writing destination of the data is "0", the data writing is carried out after the data is copied from the migration source VOL 26S to the migration destination VOL 26D before the data writing. The bit is updated to "1". When the bit corresponding to the VOL area at the copy destination of the VOL area at the data writing destination is "1", the data writing is carried out. The data copy is continued until all bits change to "1".

Figure 8:
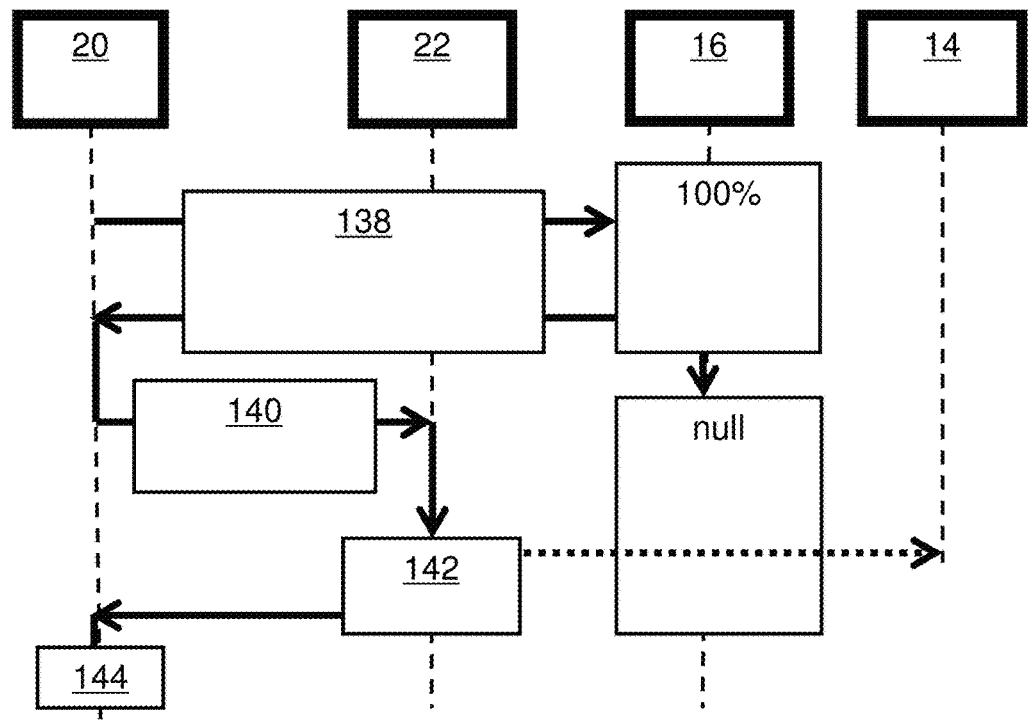
FIG. 8 is a sequence chart of migration source SDS erasing processing according to the first embodiment.

FIG. 8 is a sequence chart of migration source SDS erasing processing. The processing in FIG. 8 corresponds to step 3 in FIG. 1.

Step 138: The migration manager 20 regularly or irregularly transmits an inquiry about a copy progress rate to the migration destination SDS 16 and receives a reply to the inquiry from the migration destination SDS 16. When a copy progress rate represented by the received replay is not "100%", the migration manager 20 transmits the inquiry about the copy progress rate to the migration destination SDS 16 again, for example, after a fixed time. If the copy progress rate represented by the received reply is "100%", this is equivalent to detection of copy completion. The processing proceeds to step 140. Note that, when the copy completion is detected (e.g., when replying with the copy progress rate "100%" and receiving confirmation from the migration manager 20), the migration destination SDS 16 updates the copy progress rate represented by the copy progress rate information 61 from "100%" to "null".

Step 140: The migration manager 20 transmits an erasing instruction for the migration source SDS 14 and the migration source VOL 26S to the virtual managing unit 22. The processing proceeds to step 142.

Step 142: The virtual managing unit 22 erases the migration source SDS 14 and the migration source VOL 26S in response to the erasing instruction. By erasing the migration source SDS 14 and the migration source VOL 26S, a virtual resource such as virtual memory allocated to the migration source SDS 14 is released (the virtual resource can be allocated to other VMs) and a virtual apparatus (a VM functioning as the migration source SDS 14) is also released from a management target of the virtual managing unit 22. Therefore, since the migration source SDS 14 itself is released from a management target of the virtual managing unit 22, the VM functioning as the migration source SDS 14 is also deleted from a management target of the management VM 18. The virtual managing unit 22 notifies processing completion to the migration manager 20 as a response to the erasing instruction. The processing proceeds to step 144.

Step 144: The migration manager 20 ends the processing.

An SDS is an example of a VM to which virtualized resource is allocated. The SDS itself cannot perform both of reservation and release of a resource. However, according to this embodiment, the migration manager 20 that transmits an instruction interpretable by the virtual managing unit 22 that provides a virtual resource and controls generation and erasing of a VM is separately provided. According to cooperation of the migration manager 20 and the virtual managing unit 22 (an instruction from the migration manager 20 and operation of the virtual managing unit 22 responding to the instruction), the migration destination VOL 26D is associated with the migration destination SDS 16, data of the migration source VOL 26S is copied to the migration destination VOL 26D, and, after detection of completion of the copy, it is possible to release the migration source SDS itself including a virtual resource allocated to the migration source SDS 14. Consequently, use efficiency of resources is improved and it is possible to achieve a reduction in virtual resources and cost for SDS management.

Second Embodiment

A second embodiment is explained. Differences from the first embodiment are mainly explained. Concerning similarities to the first embodiment, explanation is omitted or simplified.

Figure 9:
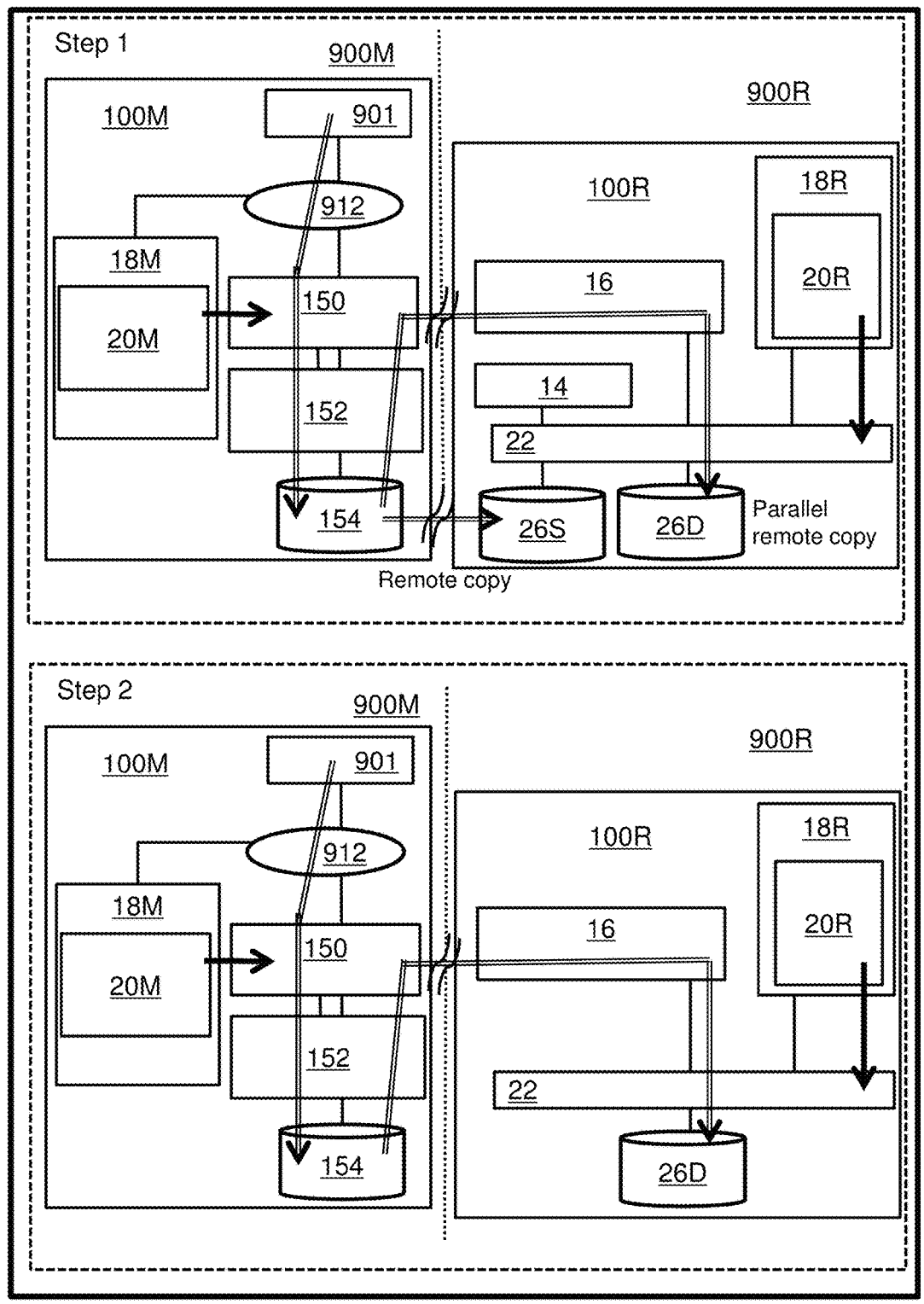
FIG. 9 shows an overview of a second embodiment.

FIG. 9 shows an overview of the second embodiment.

A computer system 100M in a main site 900M includes a migration source storage 152. A PVOL 154, which is a backup source, is mounted on the migration source storage 152. The migration source storage 152 may be an SDS or may be an example of a physical apparatus. A system configured from at least one of the migration source storage 152 and a migration destination storage 150 explained below is generally referred to as "main storage". The "PVOL" is an abbreviation of a primary VOL and is an example of a copy source logical volume of a first logical volume. A host 901 is present in the main site 900M.

A computer system 100R in a remote site 900R includes the virtual managing unit 22. The migration source SDS 14 is present and an SVOL 26S, which is a backup destination, is mounted on the virtual managing unit 22. The SVOL 26S is an abbreviation of a secondary VOL, an example of a first logical volume, and equivalent to the migration source VOL explained above. A pair of the PVOL 154 and the SVOL 26S is configured.

Data is remote-copied (backup-copied) from the PVOL 154 to the SVOL 26S. The pair of the PVOL 154 and the SVOL 26S may be a synchronous pair or may be an asynchronous pair.

The "synchronous pair" is a pair in which, when data (in this paragraph, "data X") written in the PVOL 154 anew according to an I/O request from the host 901 is copied to the SVOL 26S, a response to the I/O request is returned to the host 901, "The data X is written in the PVOL 154" means that the data X is actually written in the PVOL 154. However, this may mean that the data X is written in a cache memory of a main storage. "The data X is copied to the SVOL 26S" means that the data X is actually written in the SVOL 26S. However, this may mean that the data X is written in a cache memory of the migration source SDS 14 (at least a part of an area of the virtual memory 46S). On the other hand, the "asynchronous pair" is a pair in which, when the data X is written in the PVOL 154 anew according to an I/O request from the host 901, the I/O request is returned to the host 901 (copy of the data X to the SVOL 26S may be performed after the response is returned).

In the second embodiment, in addition to migration from the migration source SDS 14 to the migration destination SDS 16 in the remote site 900R, migration from the migration source storage 152 to the migration destination storage 150 in the main site 900M is performed. The PVOL 154 is associated with the migration destination storage 150 through the migration source storage 152. Therefore, when the migration destination storage 150 receives an I/O request designating identification information of the PVOL 154 via a network (e.g., a LAN (Local Area Network)) 912, I/O conforming to the I/O request is executed through the migration destination storage 150 and the migration source storage 152. The network 912 may be a physical communication network or may be a virtual network.

A main migration manager 20M executed in a management server 18M manages the main storage. The management server 18M may be an example of a physical apparatus or may be an example of a virtual apparatus. The main migration manager 20M is a computer program for managing the main storage.

A management VM 18R is present in the remote site 900R. A migration manager executed in the management VM 18R is referred to as "remote migration manager". A remote migration manager 20R issues an instruction to the virtual managing unit 22 and creates the migration destination SDS 16. A migration destination SVOL 26D is associated with the migration destination SDS 16. The migration destination SVOL 26D is an example of a second logical volume, a migration destination of the SVOL 26S, and equivalent to the migration destination VOL explained above.

The computer system 100M may include a virtual managing unit. At least one of the host 901, the network 912, the migration source storage 152, the migration destination storage 150152, and the management server 18M may be a virtual element generated or managed by the virtual managing unit.

Although not shown in the figure, the computer systems 100M and 100R are coupled via a network (hereinafter, inter-system network). Remote copy is performed through the inter-system network (e.g., a LAN or a WAN (Wide Area Network)). Note that remote copy from the PVOL 154 to the SVOL 26S is performed through the migration source storage 152, the inter-system network (not shown in the figure), and the migration source SDS 14 before migration of each of the migration source storage 152 and the migration source SDS 14.

<Step 1>

In the remote site 900R, the migration destination SDS 16 is created in response to an instruction from the remote migration manager 20R. In the main site 900M, the PVOL 154 is associated with the migration destination storage 150 through the migration source storage 152 (external coupling of the PVOL 154). The main migration manager 20M instructs the migration destination storage 150 to carry out remote copy (parallel data backup) from the PVOL 154 to the migration destination SVOL 26D in parallel to the remote copy (data backup) from the PVOL 154 to the SVOL 26S. The parallel remote copy (the parallel data backup) is carried out in response to the instruction. Note that the PVOL 154 and the migration destination SVOL 26D may be paired. That is, a pair of the PVOL 154 and the migration destination SVOL 26D may be present in addition to a pair of the PVOL 154 and the SVOL 26S.

After the external coupling of each of the PVOL 154 and the migration source SVOL 26S, the remote copy from the PVOL 154 to the SVOL 26S is performed through the migration source storage 152, the inter-system network (not shown in the figure), and the migration source SDS 14. The parallel remote copy from the PVOL 154 to the migration destination SVOL 26D is performed through the migration source storage 152, the migration destination storage 150, the inter-system network (not shown in the figure), and the migration destination SDS 16.

<Step 2>

When completion of the parallel remote copy is detected, the main migration manager 20M transmits a pair division instruction, which is an instruction to divide the pair of the PVOL 154 and the SVOL 26S, to the migration source storage 152. The remote migration manager 20R transmits an erasing instruction for the migration source SDS 14 and the SVOL 26S to the virtual managing unit 22. The migration source SDS 14 and the SVOL 26S are erased by the virtual managing unit 22 in response to the erasing instruction.

According to the second embodiment, since the migration source SDS 14 and the migration source SVOL 26S are erased even when the remote copy (the data backup) is introduced, it can be expected that at least one of resources and cost is reduced. Since the SDS migration can be carried out without stopping the remote copy from the PVOL 154 to the SVOL 26S, it is possible to execute the SDS migration in the remote site 900R irrespective of whether the pair of the PVOL 154 and the SVOL 26S is the synchronous pair or the asynchronous pair. In this embodiment, for example, a vendor of the migration source SDS 14 and a vendor of the migration destination SDS 16 are different and a vendor of the migration destination storage 150 and a vendor of the migration destination SDS 16 are the same.

As processing performed in the second embodiment, the entire processing in FIG. 5, a part of (step 98 to step 104) of the processing in FIG. 6, the parallel remote copy, and the erasing of the migration source SDS 14 and the SVOL 26S are performed. In the second embodiment, the SVOL 26S may be associated with the migration destination SDS 16. However, even in that case, until at least the parallel remote copy is completed, the migration source SDS 14 is necessary for continuation of the remote copy from the PVOL 154 to the SVOL 26S (further, for example, without stopping the I/O request reception from the host 901).

Figure 10:
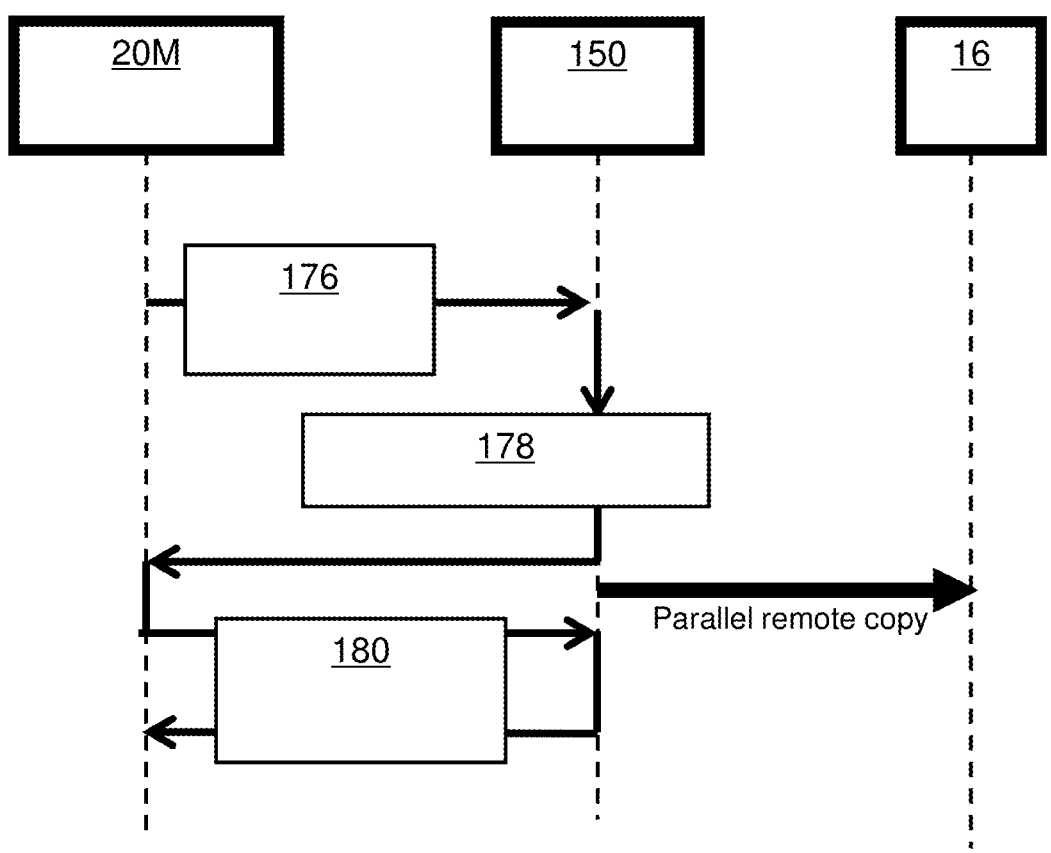
FIG. 10 is a sequence chart of parallel remote copy processing according to the second embodiment.

FIG. 10 is a sequence chart of parallel remote copy processing according to the second embodiment.

Step 176: The main migration manager 20M transmits a parallel remote copy instruction to the migration destination storage 150. The parallel remote copy instruction is an instruction to start the parallel remote copy from the PVOL 154 to the migration destination SVOL 26D (the remote copy performed in parallel to the remote copy from the PVOL 154 to the SVOL 26S). The processing proceeds to step 178.

Step 178: The migration destination storage 150 starts the parallel remote copy in response to the parallel remote copy start instruction and updates the copy information 47 according to a progress of the copy. In the second embodiment, at least one of the migration destination storage 150 and the migration destination SDS 16, for example, the migration destination storage 150 retains and updates copy information. Alternatively, at least one of the main migration manager 20M and the remote migration manager 20R may retain and update the copy information. Of first copy information concerning first remote copy from the PVOL 154 to the SVOL 26S and second copy information concerning second remote copy (the parallel remote copy) from the PVOL 154 to the migration destination SVOL 26D, the copy information may include at least the second copy information. The configuration of each of the first copy information and the second copy information may be the same as the configuration of the copy information 47. That is, the first copy information may include first copy progress rate information representing a first copy progress rate, which is a progress rate concerning the first remote copy, and a first copy progress bitmap, which is a bitmap representing a difference between the PVOL 154 and the SVOL 26S. The second copy information may include second copy progress rate information representing a second copy progress rate, which is a progress rate of the second remote copy, and a second copy progress bitmap, which is a bitmap representing a difference between the PVOL 154 and the migration destination SVOL 26D. If all bits of the first copy progress bitmap are "1", the first copy progress rate is "100%". Similarly, if all bits of the second copy progress bitmap are "1", the second copy progress rate is "100%". The migration destinat ion storage 150 notifies processing completion to the main migration manager 20M as a response to the parallel remote copy start instruction. The processing proceeds to step 180.

Step 180: The main migration manager 20M regularly or irregularly transmits an inquiry about at least the second copy progress rate of the first and second copy progress rates to the migration destination storage 150. The main migration manager 20M receives a reply of the second copy progress rate as a response to the inquiry. Note that the migration destination storage 150 may regularly or irregularly notify at least the second copy progress rate to the main migration manager 20M without receiving the inquiry from the main migration manager 20M. When detecting that the second copy progress rate reaches "100%", the migration destination storage 150 may notify completion of the parallel remote copy to the main migration manager 20M. In any case, the main migration manager 20M can learn presence or absence of the completion of the parallel remote copy from information received from the migration destination storage 150.

Figure 11:
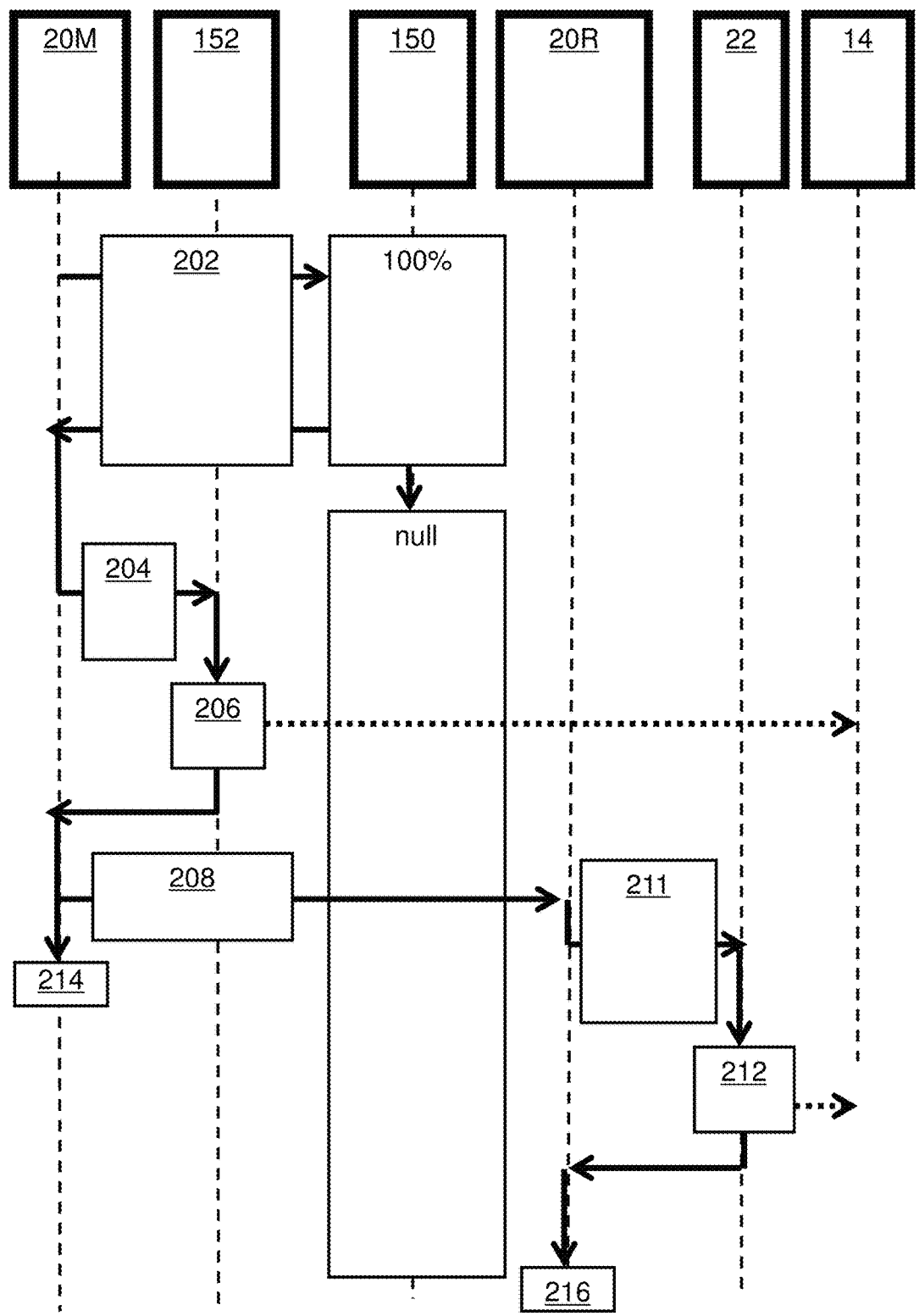
FIG. 11 is a sequence chart of migration source SDS erasing processing according to the second embodiment.

FIG. 11 is a sequence chart of migration source SDS erasing processing according to the second embodiment.

Step 202: The main migration manager 20M regularly or irregularly transmits an inquiry about the second copy progress rate to the migration destination storage 150 and receives a reply to the inquiry from the migration destination storage 150. If the second copy progress rate represented by the received replay is not "100%", the main migration manager 20M transmits the inquiry about the second copy progress rate to the migration destination storage 150 again, for example, after a fixed time. If the second progress rate represented by the received reply is "100%", this is equivalent to detection of the parallel remote copy completion. The processing proceeds to step 204. Note that, when the parallel remote copy completion is detected (e.g., when replying with the second copy progress rate "100%" and receiving confirmation from the main migration manager 20M), the migration destination storage 150 updates the second copy progress rate represented by the second copy progress rate information from "100%" to "null".

Step 204: The main migration manager 20M transmits a pair division instruction, which is an instruction to divide the pair of the PVOL 154 and the SVOL 26S, to at least one of the migration source storage 152 and the migration destination storage 150. In this embodiment, the pair division instruction is transmitted to the migration source storage 152. The processing proceeds to step 206.

Step 206: The migration source storage 152 divides the pair of the PVOL 154 and the SVOL 26S in response to the pair division instruction. Consequently, the first remote copy is stopped. That is, even if there is a difference between the PVOL 154 and the SVOL 26S, the remote copy from the PVOL 154 to the SVOL 26S is not performed. The migration source storage 152 notifies processing completion to the main migration manager 20M as a response to the pair division instruction. The processing proceeds to step 208.

Step 208: The main migration manager 20M notifies main site processing completion to the remote migration manager 20R. The processing proceeds to step 210. Thereafter, the processing proceeds to step 214. The main migration manager 20M ends the processing (step 214).

Step 211: The remote migration manager 20R transmits an erasing instruction for the migration source SDS 14 and the SVOL 26S to the virtual managing unit 22 in response to the notification of the main site processing completion. That is, for the remote migration manager 20R, reception of the notification of the main site processing completion is detection of the parallel remote copy completion. The processing proceeds to step 212.

Step 212: The virtual managing unit 22 erases the migration source SDS 14 and the SVOL 26S in response to the erasing instruction. The virtual managing unit 22 notifies processing completion to the remote migration manager 20R as a response to the erasing instruction. Thereafter, the processing proceeds to step 216. The remote migration manager 20R ends the processing (step 216).

Third Embodiment

A third embodiment is explained. Differences from the second embodiment are mainly explained. Concerning similarities to the second embodiment, explanation is omitted or simplified.

Figure 12:
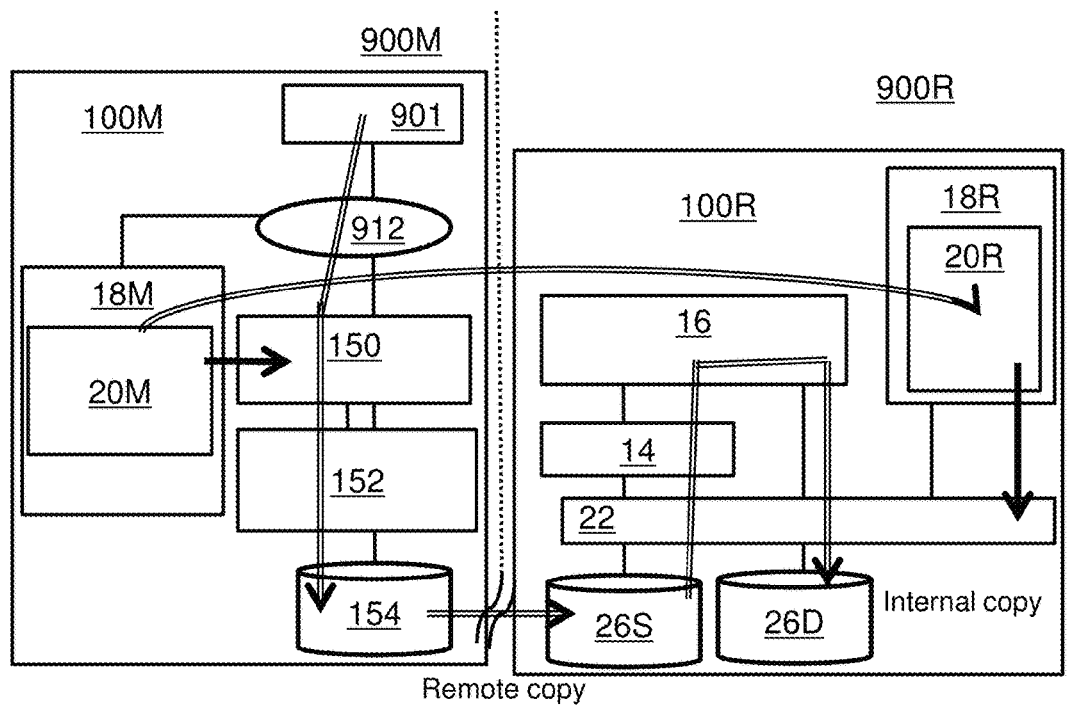
FIG. 12 shows an overview of a third embodiment.

FIG. 12 shows an overview of the third embodiment.

In addition to a first pair, which is the pair of the PVOL 154 and the SVOL 26S, there is a second pair of the SVOL 26S and the migration destination SVOL 26D.

Instead of the parallel remote copy (the parallel data backup), internal copy, which is data copy from the SVOL 26S to the migration destination SVOL 26D, is carried out. Specifically, the remote migration manager 20R instructs at least one of the virtual managing unit 22, the migration source SDS 14, and the migration destination SDS 16 to perform the internal copy from the SVOL 26S to the migration destination SVOL 26D. In response to the instruction, the internal copy from the SVOL 26S to the migration destination SVOL 26D (e.g., the internal copy through the migration source SDS 14 and the migration destination SDS 16) is carried out. When completion of the internal copy is detected, the migration source SDS 14 and the SVOL 26S are erased.

According to the third embodiment, since the internal copy is performed, a communication band between the main site 900M and the remote site 900R (a communication band of the inter-system network (not shown in the figure)) can be saved more than in the second embodiment.

Note that, in the third embodiment, the first pair (the pair of the PVOL 154 and the SVOL 26S) is the synchronous pair. However, the first pair may be the asynchronous pair.

A host write bitmap (not shown in the figure) is prepared. The host write bitmap indicates in which VOL area in the PVOL 154 data is written. The host write bitmap includes a plurality of bits respectively corresponding to a plurality of VOL areas configuring the PVOL 154. A bit corresponding to a VOL area in which data is written anew is set to "1". The host write bitmap is retained and updated by the migration destination storage 150.

The host write bitmap is retained in both of the migration destination storage 150 and the main migration manager 20M. The host write bitmap retained by the migration destination storage 150 and the host write bitmap retained by the main migration manager 20M may synchronize.

Figure 13:
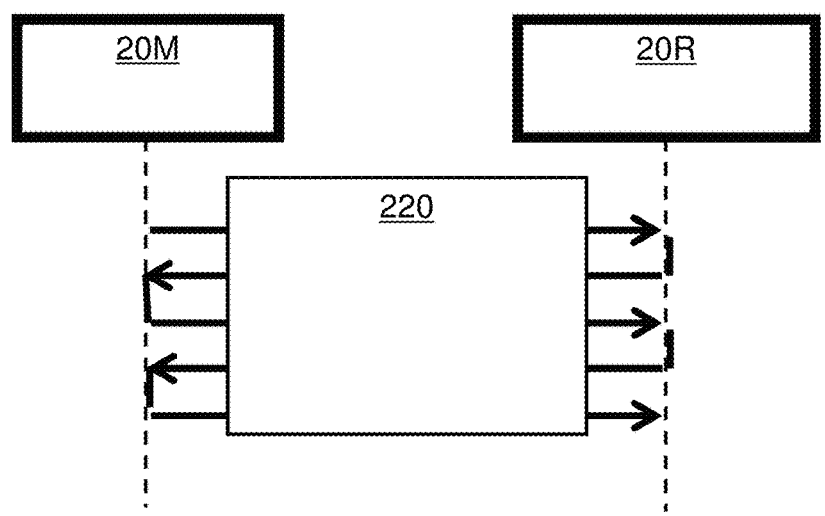
FIG. 13 is a sequence chart of PVOL update state notification processing according to the third embodiment.

FIG. 13 is a sequence chart of PVOL update state notification processing according to the third embodiment.

The "PVOL update state notification processing" is processing for notifying an update state of the PVOL 154. This processing is necessary because, when data is copied anew to a coped area (a VOL area in the SVOL 26S, which is an area in which internal copy is completed) by writing data in the PVOL 154 anew, the internal copy is necessary concerning the copied area again.

The main migration manager 20M regularly or irregularly specifies a PVOL update state from the migration destination storage 150, which retains the host write bitmap, in response to an inquiry from the remote migration manager 20R (or without the inquiry) and notifies the PVOL update state to the remote migration manager 20R. The PVOL update state to be notified may be duplication of the host write bitmap retained by the main migration manager 20M or may be information including an ID (e.g., an address) of an updated VOL area.

Figure 14:
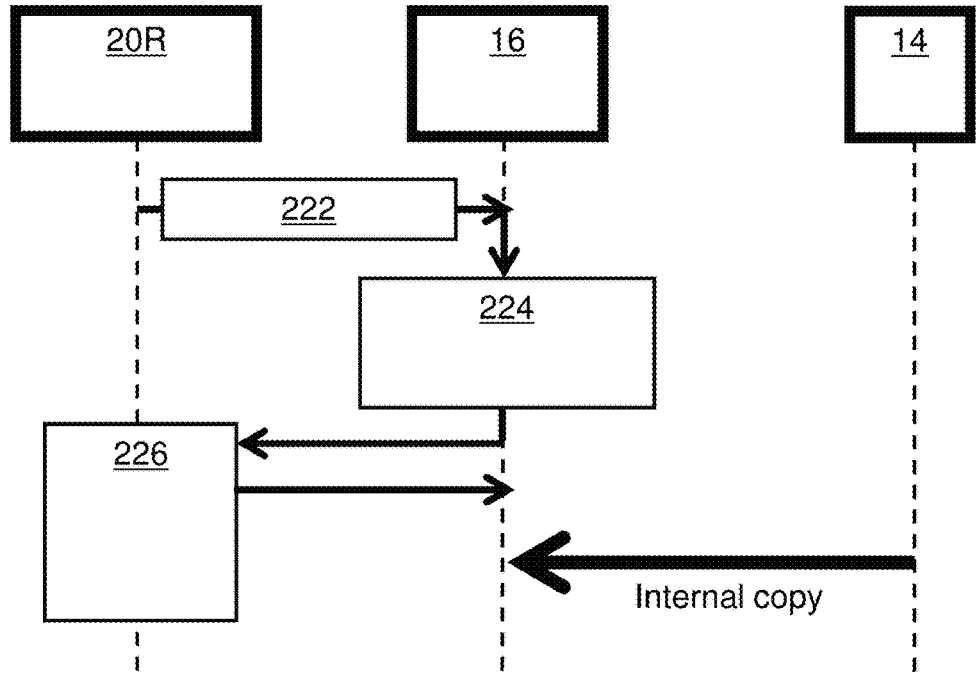
FIG. 14 is a sequence chart of internal copy processing according to the third embodiment.

FIG. 14 is a sequence chart of internal copy processing according to the third embodiment.

Step 222: The remote migration manager 20R transmits an internal copy start instruction to the migration destination SDS 16. The processing proceeds to step 224.

Step 224: The migration destination SDS 16 starts the internal copy from the SVOL 26S to the migration destination SVOL 26D in response to the internal copy start instruction and updates the copy information 47 according to a progress of the internal copy. The migration destination SDS 16 notifies processing completion to the remote migration manager 20R in response to the internal copy start instruction. The processing proceeds to step 226.

Step 226: The remote migration manager 20R refers to the PVOL update state (information specified on the basis of the host write bitmap). If there is a target part (a VOL area), which is a part where the internal copy has to be additionally carried out, the remote migration manager 20R notifies an additional internal copy instruction designating an address of the target part to the migration destination SDS 16 and updates a bit (a bit in the host write bitmap retained by the remote migration manager 20R) corresponding to the target part from "1" to "0". Data is copied from a VOL area (a VOL area corresponding to the target part address) in the SVOL 263 to a VOL area (a VOL area corresponding to the target part address) in the migration destination SVOL 26D (additional internal copy) in response to the additional internal copy instruction. The update of the bit corresponding to the target part is notified from the remote migration manager 20R to the main migration manager 20M by communication shown in FIG. 13. The main migration manager 20M updates a bit (a bit in the host write bitmap retained by the main migration manager 20M) corresponding to the target part from "1" to "0". The update is reflected on the host write bitmap retained by the migration destination storage 150 as well.

Step 226 is regularly or irregularly repeated until the internal copy is completed.

Figure 15:
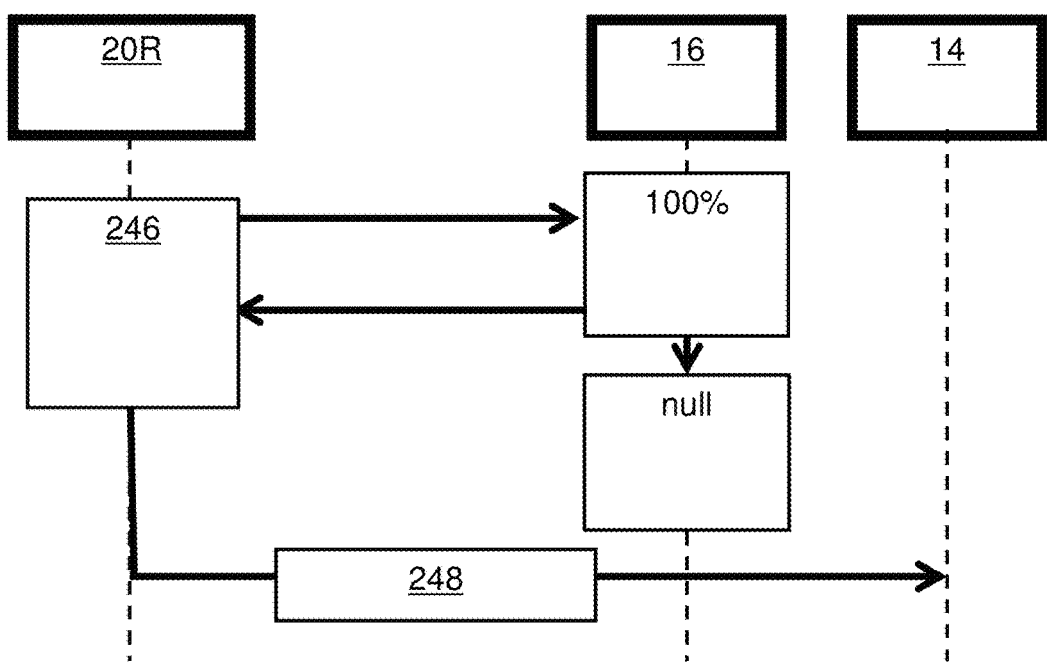
FIG. 15 is a sequence chart of migration source SDS erasing processing according to the third embodiment.

FIG. 15 is a sequence chart of migration source SDS erasing processing according to the third embodiment.

Step 246: The remote migration manager 20R regularly or irregularly transmits an inquiry about a copy progress rate (a progress rate of the internal copy) to the migration destination SDS 16 and receives a reply to the inquiry from the migration destination SDS 16. If the copy progress rate represented by the received replay is "100%", the remote migration manager 20R determines necessity of additional internal copy referring to the host write bitmap. When the additional internal copy is necessary, the additional internal copy and host write bitmap update involved in the additional internal copy are performed. When the additional internal copy is unnecessary, the processing proceeds to step 248. Note that, when step 246 is started, the main migration manager 20M may cause the migration destination storage 150 to temporarily stop receiving an I/O request (e.g., a write request) designating the PVOL 154 from the host 901. When step 246 is completed, the main migration manager 20M may cause the migration destination storage 150 to release the temporary stop.

Step 248: The remote migration manager 20R transmits a pair division instruction to divide the pair of the PVOL 154 and the SVOL 26S to the migration source SDS 14. Step 206 and subsequent steps in FIG. 11 may be performed in response to the pair division instruction. Note that the remote migration manager 20R may instruct the main migration manager 20M to divide the pair. The main migration manager 20M may transmit the pair division instruction to divide the pair of the PVOL 154 and the SVOL 26S to the migration source storage 152 in response to the instruction.

In the third embodiment, the migration destination SVOL 26D, which has completed migration, may carry out pair operation with the PVOL 154 (may be paired with the PVOL 154) or may be retained as backup data (may be independent without being paired with the PVOL 154).

The several embodiments are explained above. However, the embodiments are illustrations for the explanation of the present invention and are not meant to limit the scope of the present invention to only the embodiments. The present invention can also be carried out in other various forms.

For example, in the first to third embodiments, each of the migration source SDS 14 and the migration destination SDS 16 is the VM. However, the migration source SDS 14 may be software executed in a first VM. The migration destination SDS 16 may be software executed in a second VM. The first and second VMs may respectively execute first and second guest OSs of the same type provided by the virtual managing unit 22. When receiving an instruction from the migration manager 20 (20R) or the virtual managing unit 22, each of the first and second guest OSs may execute processing conforming to the instruction. The migration manager 20 (20R) may transmit an erasing instruction for the migration source SDS 14 to the first VM not through the virtual managing unit 22 or may transmit the erasing instruction to the virtual managing unit 22. The first guest OS may receive the erasing instruction from the migration manager 20 (20R) or the virtual managing unit 22 and erase the migration source SDS 14 in response to the erasing instruction.

In at least one of the first to third embodiment, at least one of the migration manager 20, the main migration manager 20M, and the remote migration manager 20R may be installed from a program source. The program source may be a program distribution server or a recording medium (e.g., a nontransitory recording medium) readable by a computer.

CITATION LIST 16 migration destination SDS

The invention claimed is:

1. A data migration method comprising:
transmitting an instruction to map a first logical volume to a second logical volume by associating target information of the first logical volume with the second logical volume to a second virtual storage, which is a migration destination of a first virtual storage that provides the first logical volume, the first virtual storage being a virtual storage to which a virtual resource provided by a virtual managing unit is allocated;
making a host accessible to data of the first logical volume via the second logical volume by transmitting an instruction to change access destination from the first logical volume to the second logical volume to which the first logical volume is mapped, to the host that access the first logical volume, transmitting a copy instruction, which is an instruction to copy data from one of the first logical volume and a copy source logical volume of the first logical volume to the second logical volume that is a mapping source; and transmitting, when the data copy to the second logical volume is completed, is detected, an erasing instruction, which is an instruction to erase the first logical volume of the first virtual storage, to the virtual managing unit.

2. The data migration method according to claim 1, wherein
a transmission destination of the copy instruction is at least one of the first virtual storage and the second virtual storage, and
the detection of the copy completion is receiving notification of the copy completion from at least one of the first virtual storage and the second virtual storage.

3. The data migration method according to claim 1, wherein the virtual managing unit erases the first virtual storage in response to the erasing instruction.

4. The data migration method according to claim 1, wherein the second virtual storage is a virtual storage generated by transmitting a creation instruction for the second virtual storage to the virtual managing unit.

5. The data migration method according to claim 1, further comprising:
transmitting an inquiry about a progress of the data copy to at least one of the first virtual storage and the second virtual storage; and
receiving a response to the inquiry from at least one of the first virtual storage and the second virtual storage, wherein
the copy completion is detected on the basis of the received response.

6. The data migration method according to claim 1, wherein
a second computer system coupled to a first computer system, which includes the virtual managing unit that provides a virtual resource to the first virtual storage, through a network and including a migration source storage apparatus is present,
the first logical volume is a secondary volume that forms a copy pair with a primary volume provided by the migration source storage apparatus, and
the copy source logical volume is the primary volume.

7. The data migration method according to claim 6, wherein
the copy to the second logical volume is performed from the primary volume,
a first migration manager realized by execution of a management program of the first computer system is capable of communicating with a second migration manager realized by execution of a management program of the second computer system, and
the first migration manager transmits the erasing instruction to the virtual managing unit in response to an instruction from the second migration manager that detects the completion of the data copy to the second logical volume.

8. The data migration method according to claim 6, wherein copy of data from the primary volume to the secondary volume is performed in parallel to the data copy.

9. The data migration method according to claim 1, wherein the virtual managing unit is realized by a physical processor executing a virtualization program.

10. A computer system comprising:
a virtual managing unit configured to provide a virtual resource; and
a migration manager, wherein
the migration manager is configured to
transmit an instruction map a first logical volume to a second logical volume by associating target information of the first logical volume with the second logical volume to a second virtual storage, which is a migration destination of a first virtual storage that provides the first logical volume, the first virtual storage being a virtual storage to which a virtual resource provided by a virtual managing unit is allocated;
making a host accessible to data of the first logical volume via the second logical volume by transmitting an instruction to change access destination from the first logical volume to the second logical volume to which the first logical volume is mapped, to the host that access the first logical volume,
transmit a copy instruction, which is an instruction to copy data from one of the first logical volume and a copy source logical volume of the first logical volume to the second logical volume that is a mapping source, and
transmit, when the data copy to the second logical volume is completed, is detected, an erasing instruction, which is an instruction to erase the first virtual storage, to the virtual managing unit, and
the virtual managing unit erases the first logical volume of the first virtual storage in response to the erasing instruction.

11. A computer-readable recording medium having recorded therein a computer program for causing a computer to execute:
transmitting an instruction to map a first logical volume to a second logical volume by associating target information of the first logical volume with the second logical volume to a second virtual storage, which is a migration destination of a first virtual storage that provides the first logical volume, the first virtual storage being a virtual storage to which a virtual resource provided by a virtual managing unit is allocated;
making a host accessible to data of the first logical volume via the second logical volume by transmitting an instruction to change access destination from the first logical volume to the second logical volume to which the first logical volume is mapped, to the host that access the first logical volume,
transmitting a copy instruction, which is an instruction to copy data from one of the first logical volume and a copy source logical volume of the first logical volume to the second logical volume that is a mapping source; and
transmitting, when the data copy to the second logical volume is completed, is detected, an erasing instruction, which is an instruction to erase the first logical volume of the first virtual storage, to the virtual managing unit.

12. The recording medium according to claim 11, wherein
a transmission destination of the copy instruction is at least one of the first virtual storage and the second virtual storage, and the detection of the copy completion is receiving notification of the copy completion from at least one of the first virtual storage and the second virtual storage.

13. The recording medium according to claim 11, wherein the second virtual storage is a virtual storage generated by transmitting a creation instruction for the second virtual storage to the virtual managing unit.

* * * * *